United States Patent
Lehner

(10) Patent No.: US 7,005,975 B2
(45) Date of Patent: Feb. 28, 2006

(54) MISSING FUEL CAP DETECTION SYSTEM

(75) Inventor: Chad W. Lehner, Howell, MI (US)

(73) Assignee: General Motors Corporation, Detroit, MI (US)

( * ) Notice: Subject to any disclaimer, the term of this patent is extended or adjusted under 35 U.S.C. 154(b) by 224 days.

(21) Appl. No.: 10/663,308

(22) Filed: Sep. 16, 2003

(65) Prior Publication Data

US 2005/0057349 A1    Mar. 17, 2005

(51) Int. Cl.
*B60G 1/00*    (2006.01)

(52) U.S. Cl. ............... 340/438; 340/451; 73/49.7; 73/118.1

(58) Field of Classification Search ........... 340/438, 340/439, 457.4, 451, 450, 435, 450.3, 450.1, 340/450.2; 73/49.7, 118.1; 701/31
See application file for complete search history.

(56) References Cited

U.S. PATENT DOCUMENTS

| 5,451,927 A | * | 9/1995 | Thompson ............... 340/457 |
| 6,202,478 B1 | * | 3/2001 | Blomquist et al. ......... 73/49.7 |
| 6,208,245 B1 | * | 3/2001 | Post et al. ............. 340/457.4 |
| 6,285,934 B1 | * | 9/2001 | Shaw ..................... 701/36 |

\* cited by examiner

*Primary Examiner*—Anh V. La
(74) *Attorney, Agent, or Firm*—Christopher DeVries

(57) ABSTRACT

A method for detecting a missing or improperly installed fuel cap on a vehicle includes a first leak test that detects a leak in an evaporative emissions system of a vehicle. A refueling test detects a refueling of the vehicle when the first leak test detects the leak. A fuel cap indicator in the vehicle is activated when the first leak test detects the leak and the refueling test detects the refueling. The fuel cap indicator is deactivated after a predetermined time period. The fuel cap indicator remains deactivated when a predetermined number of leak tests consecutively detect the leak. The fuel cap indicator is deactivated when an occupant of the vehicle indicates that a fuel cap of the vehicle is properly installed. The occupant activates an actuator on an instrument panel of the vehicle to indicate the fuel cap is properly installed.

18 Claims, 4 Drawing Sheets

MISSING FUEL CAP DETECTION SYSTEM

FIELD OF THE INVENTION

The present invention relates to vehicles, and more particularly to onboard diagnostics for vehicles.

BACKGROUND OF THE INVENTION

On Board Diagnostic (OBD) systems monitor the performance of components of vehicle emissions systems. For example, one OBD system detects leaks in an evaporative emissions system of a vehicle. Typically, an engine malfunction indicator is activated when two consecutive leak tests fail. However, a missing or improperly installed fuel cap will cause the leak test failure to occur. A vehicle owner may have the vehicle serviced when the engine malfunction indicator is activated. Technicians may inefficiently spend time tightening or replacing the fuel cap to solve the problem.

In one conventional method, a controller activates a fuel cap indicator after running a system diagnostic. The fuel cap indicator is tied directly to an engine malfunction indicator. Whenever the engine malfunction indicator is activated due to a leak test failure, the fuel cap indicator is also activated. The diagnostic has no ability to distinguish between a leak that occurs due to a missing or improperly replaced fuel cap and other large leaks that may occur. When the fuel cap is tightened or replaced, the fuel cap indicator could remain activated if the leak test failure occurs for a different reason.

Another method uses a sensor to physically detect when a fuel cap is properly installed. The sensor adds cost to the vehicle. The increased number of parts and wiring also increases warranty claims.

SUMMARY OF THE INVENTION

A method for detecting a missing or improperly installed fuel cap on a vehicle according to the present invention includes conducting a first leak test that detects a leak in an evaporative emissions system of a vehicle. A refueling test is conducted that detects a refueling of the vehicle when the first leak test detects the leak. A fuel cap indicator in the vehicle is activated when the first leak test detects the leak and the refueling test detects the refueling.

In other features, the fuel cap indicator is deactivated after a predetermined time period. The predetermined time period is sufficient to allow an occupant of the vehicle to determine a condition of a fuel cap of the vehicle. A second leak test is conducted. The fuel cap indicator is activated when the second leak test detects the leak. An engine malfunction indicator in the vehicle is activated when the first and second leak tests consecutively detect the leak. The fuel cap indicator is deactivated after the predetermined time period. The fuel cap indicator remains deactivated when a predetermined number of leak tests consecutively detect the leak.

In still other features of the invention, the fuel cap indicator is deactivated when an occupant of the vehicle indicates that a fuel cap of the vehicle is properly installed. The fuel cap indicator remains deactivated when an occupant of the vehicle indicates that a fuel cap of the vehicle is properly installed. The occupant activates an actuator on an instrument panel of the vehicle to indicate the fuel cap is properly installed. The fuel cap indicator is one of a visible indicator, an audible indicator, and a haptic indicator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
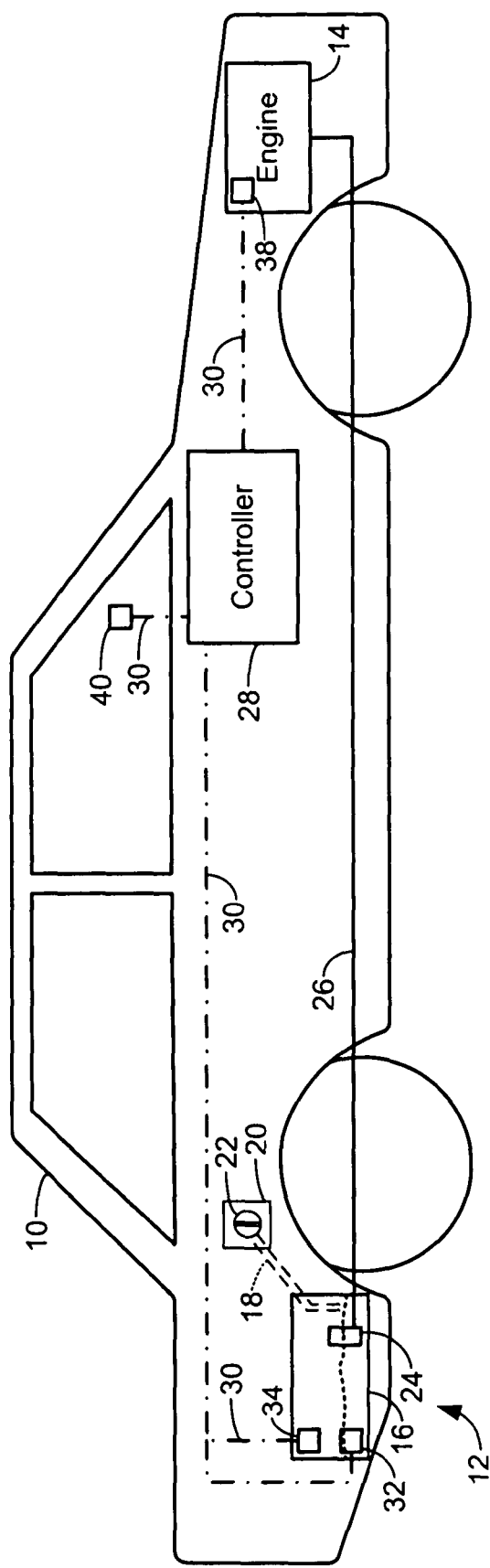
FIG. 1 illustrates a vehicle including a controller that communicates with vehicle sensors according to the prior art.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, a vehicle 10 includes a fuel system 12 that provides fuel to an engine 14 for combustion. The fuel system 12 includes a fuel tank 16 that stores liquid and vapor fuel. A fuel inlet 18 extends from the fuel tank 16 to an exterior location 20 to enable fueling. A fuel cap 22 closes the fuel inlet 18. A fuel pump 24 pumps liquid fuel through a liquid fuel line 26 to the engine 14. A controller 28 receives signals 30 from sensors in the vehicle 10 to monitor conditions of the vehicle 10 and/or vehicle systems. The sensors include a fuel level sensor 32 and a vapor pressure sensor 34 in the fuel tank 16. The controller 28 also receives signals 30 from a temperature sensor 38 that monitors the temperature of the engine 14 and an ignition 40. The controller 28 may be an independent controller or may form part of another vehicle controller. While one controller is shown in FIG. 1, multiple controllers can be used. The controller 28 implements an On Board Diagnostic (OBD) system that detects leaks in an evaporative emission system of the vehicle 10, as will be described below.

Figure 2:
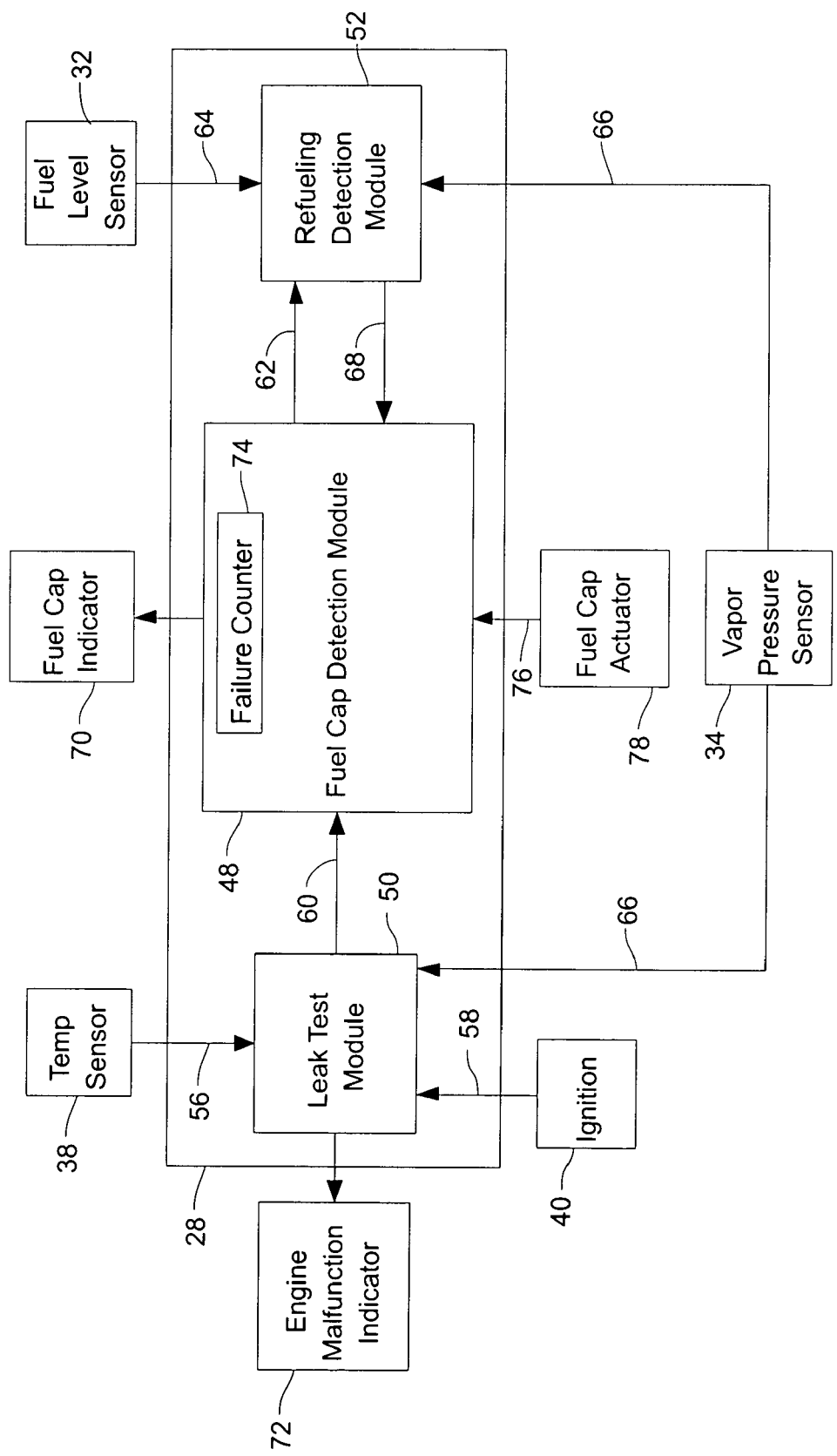
FIG. 2 is a functional block diagram of a missing fuel cap detection system according to the present invention.

Referring now to FIG. 2, the controller 28 distinguishes between leaks caused by a missing or improperly installed fuel cap and other types of leaks. The controller 28 includes a fuel cap detection module 48, a leak test module 50, and a refueling detection module 52. The leak test module 50 detects leaks in the evaporative emissions system of the vehicle 10. The leak test module 50 receives a vapor pressure signal 66 from the vapor pressure sensor 34, a temperature signal 56 from the temperature sensor 38, and an ignition signal 58 from the ignition 40. The vapor pressure sensor 66 monitors a pressure in the evaporative emissions system of the vehicle 10. The temperature sensor 38 monitors a temperature of the engine 14. The ignition signal 58 indicates when the vehicle 10 is started.

During a leak test, the vapor pressure sensor 66 monitors the pressure in the evaporative emissions system as vapor is vacated from the system. A missing or improperly installed fuel cap or other leak above a predetermined size prevents the system from experiencing a vacuum condition. The leak test is preferably performed at least after every cold start of the engine 14. The leak test module 50 transmits a leak test signal 60 to the fuel cap detection module 48. The leak test signal 60 indicates when a leak test fails.

The most likely time the fuel cap 22 would be improperly installed is after a refueling of the vehicle 10. The fuel cap detection module 48 transmits a refueling detection signal 62 to the refueling detection module 52. The refueling detection module 52 receives a fuel level signal 64 from the fuel level sensor 32 and a vapor pressure signal 66 from the vapor pressure sensor 34. Based on the values of the fuel level signal 64 and/or the vapor pressure signal 66, the refueling detection module 52 detects refueling events. For example, the refueling detection module 52 may store a value from the fuel level signal 64 when the vehicle 10 is turned off. When the vehicle 10 is started, the previous value may be compared to a present value of the fuel level signal 64. An increase in the fuel level indicates a refueling event while the vehicle 10 was off. The refueling detection module 52 uses the vapor pressure signal 66 to detect a refueling event that takes place while the vehicle 10 remains activated. The refueling detection module 52 transmits a refueling signal 68 to the fuel cap detection module 48. The refueling signal 68 indicates a recent refueling event.

Based on the leak test signal 60 and the refueling signal 68, the fuel cap detection module 48 activates a fuel cap indicator 70 in the vehicle 10. The fuel cap indicator 70 instructs an occupant of the vehicle 10 to check the fuel cap 22. Additionally, the leak test module 50 activates an engine malfunction indicator 72. The engine malfunction indicator 72 informs the occupant that the engine 14 needs to be checked. The fuel cap indicator 70 can be any type of indicator including a visible indicator, an audible indicator, and/or a haptic indicator.

The fuel cap detection module 48 activates the fuel cap indicator 70 after a leak test failure. However, the present invention does not physically detect the presence or condition of the fuel cap 22. Therefore, the fuel cap detection module 48 deactivates the fuel cap indicator 70 after a predetermined time period. This avoids redundant notification to the occupant to check the fuel cap 22 when the fuel cap 22 is properly installed. For example, the predetermined time period may be 20 seconds. The fuel cap detection module 48 preferably activates the fuel cap indicator 70 only when a leak test fails and there was a recent refueling event. Leak test failures that do not take place following a recent refueling event are not likely related to the fuel cap 22.

A leak test failure counter 74 indicates the number of consecutive leaks tests that have failed. The leak test module 50 activates the engine malfunction indicator 72 after two consecutive leak test failures. The fuel cap indicator 70 allows the occupant to check the fuel cap 22 after one leak test failure before possibly instructing the occupant to check the engine 14 unnecessarily. After multiple consecutive leak test failures, it is likely that the leak is unrelated to the condition of the fuel cap 22.

The fuel cap indicator 70 preferably remains deactivated after a predetermined number of leak test failures. This attempts to eliminate redundant notification to the occupant to check the fuel cap 22 when a leak is unrelated to the fuel cap 22 and the occupant has already tightened and/or replaced the fuel cap 22.

The fuel cap detection module 48 receives an actuator signal 76 from a fuel cap actuator 78 in the vehicle 10. The fuel cap indicator 70 preferably remains deactivated following a leak test failure when an occupant activates the fuel cap actuator 78. The occupant activates the fuel cap actuator 78 to indicate that the fuel cap 22 is properly installed. The fuel cap indicator 70 also preferably deactivates before the predetermined time period when the occupant activates the fuel cap actuator 78. The fuel cap actuator 78 may be a button on an instrument panel of the vehicle 10 or another actuator. When the fuel cap actuator 78 is activated, the fuel cap indicator 70 remains deactivated while leak tests continue to consecutively fail.

Figure 3:
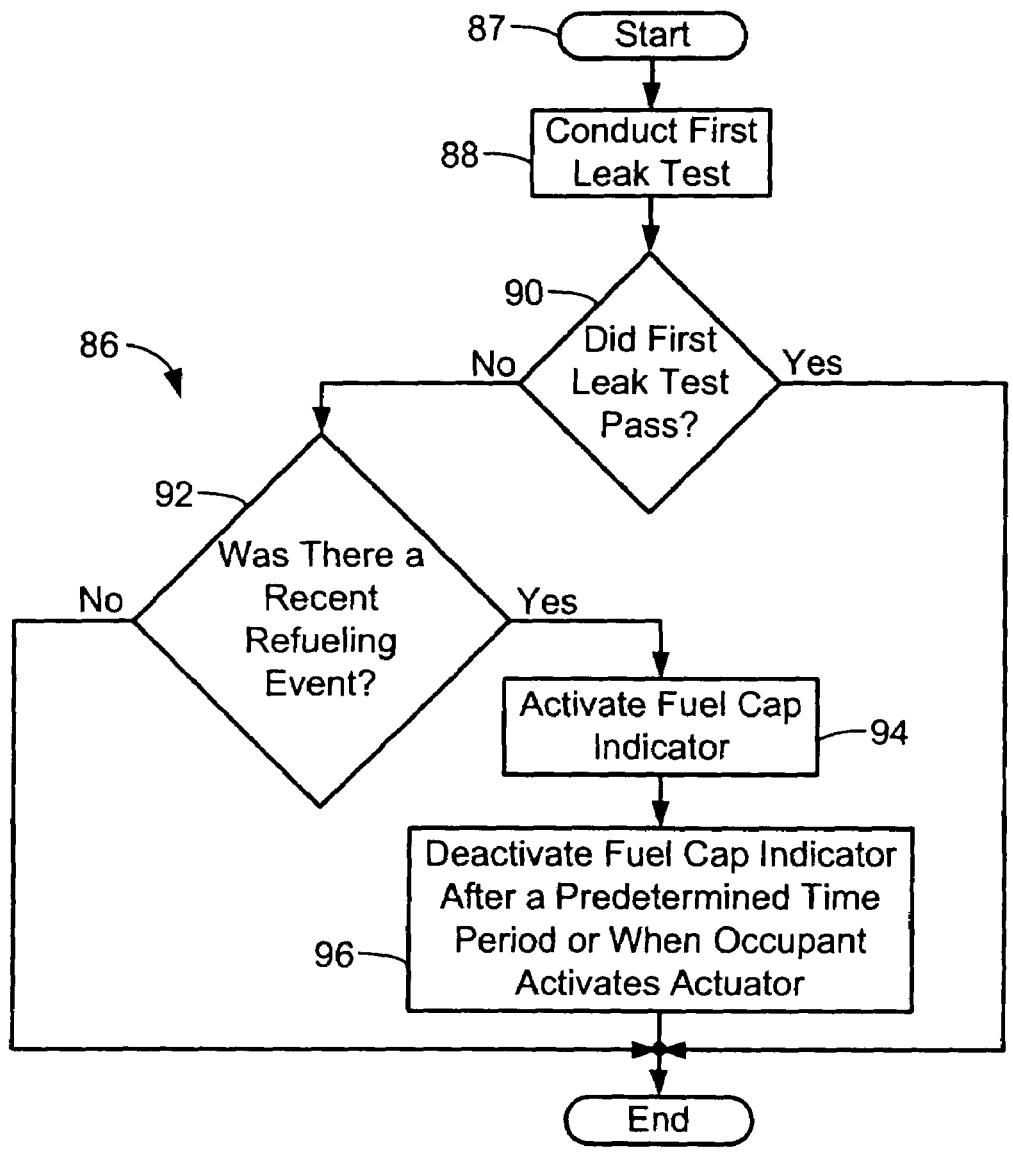
FIG. 3 is a flowchart of a missing fuel cap detection algorithm.

Referring now to FIG. 3, the controller 28 implements steps 86 to identify a missing fuel cap. Control begins in step 87. In step 88, the leak test module 50 conducts a first leak test. In step 90, the leak test module 50 determines whether the first leak test passed. If true, control ends. If false, the refueling detection module 52 determines whether there was a recent refueling event in step 92. If false, control ends. If true, control proceeds to step 94. In step 94, the fuel cap detection module 48 activates the fuel cap indicator 70. In step 96, the fuel cap detection module 48 deactivates the fuel cap indicator 70 after a predetermined time period or when the occupant activates the fuel cap actuator 78 and control ends.

Figure 4:
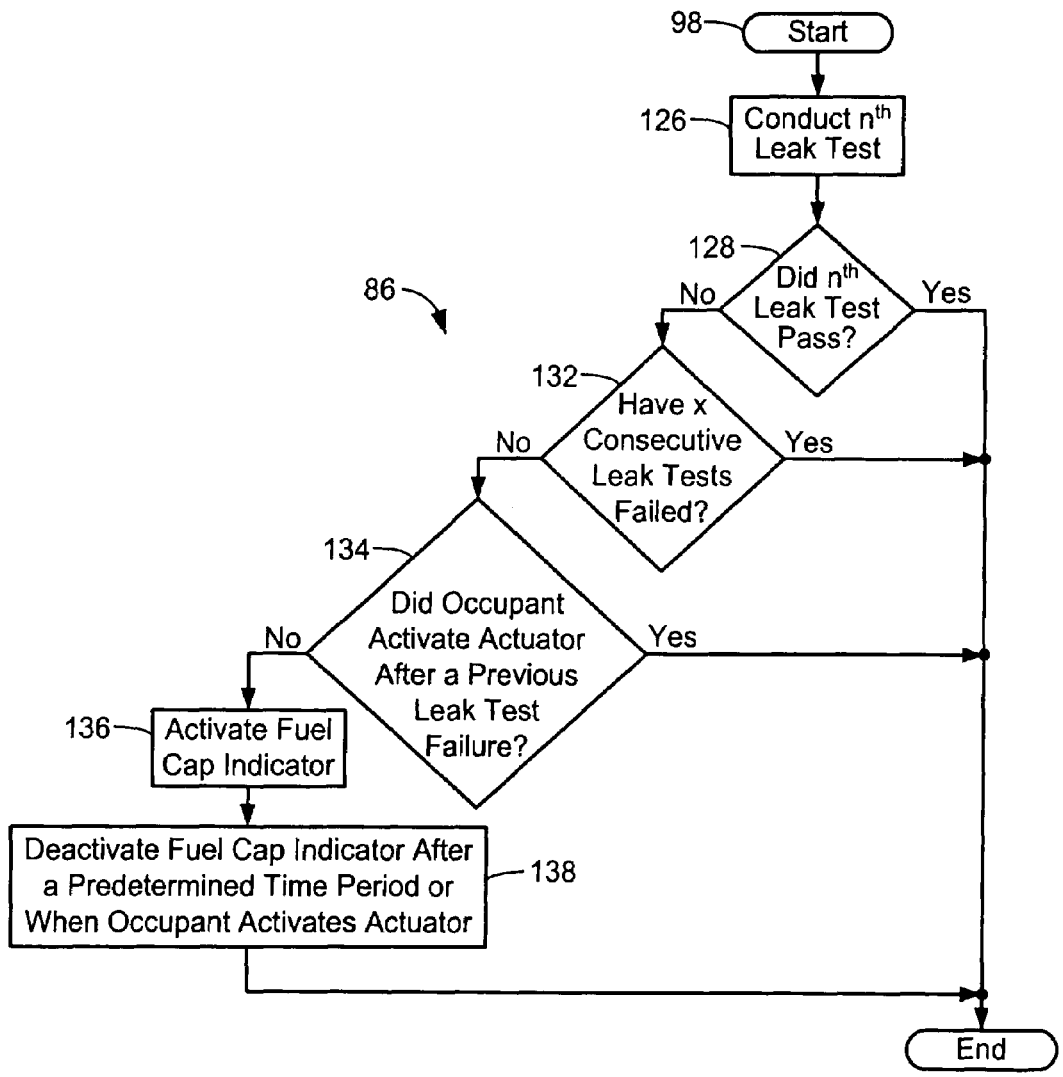
FIG. 4 is a flowchart of the missing fuel cap detection algorithm following a first leak test failure and a recent refueling event.

Referring now to FIG. 4, control begins in step 98. In FIG. 4 it is assumed that a prior leak test failure following a recent refueling event has occurred. In step 126, the leak test module 50 conducts an $n^{th}$ (greater than one) leak test. In step 128, the leak test module 50 determines if the $n^{th}$ leak test passed. If true, control ends. If false, the fuel cap detection module 48 determines whether a predetermined number (x in FIG. 4) of consecutive leak tests have failed in step 132. For example, the fuel cap detection module 48 may determine if four consecutive leak tests have failed. If true, control ends. If false, the fuel cap detection module 48 determines if the occupant activated the fuel cap actuator 78 after a previous and consecutive leak test failure in step 134. If true, control ends. If false, control proceeds to step 136. In step 136, the fuel cap detection module 48 activates the fuel cap indicator 70. In step 138, the fuel cap detection module 48 deactivates the fuel cap indicator 70 after a predetermined time period or when the occupant activates the fuel cap actuator 78 and control ends.

The missing fuel cap detection algorithm of the present invention is a significant enhancement to the existing method for instructing an occupant of a vehicle to check a fuel cap. Warranty claims and costs are reduced by decreasing the number of vehicles that are unnecessarily serviced because of customer induced faults. The missing fuel cap detection algorithm is easy to implement since it only requires software changes to existing systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method for detecting a missing or improperly installed fuel cap on a vehicle, comprising:
   conducting a first leak test that detects a leak in an evaporative emissions system of a vehicle;
   selectively conducting a refueling test that detects a refueling of said vehicle when said first leak test detects said leak; and activating a fuel cap indicator in said vehicle when said first leak test detects said leak and said refueling test detects said refueling.

2. The method of claim 1 further comprising:
deactivating said fuel cap indicator after a predetermined time period.

3. The method of claim 2 wherein said predetermined time period is sufficient to allow an occupant of said vehicle to determine a condition of a fuel cap of said vehicle.

4. The method of claim 2 further comprising:
conducting a second leak test;
activating said fuel cap indicator when said second leak test detects said leak;
activating an engine malfunction indicator in said vehicle when said first and second leak tests consecutively detect said leak; and
deactivating said fuel cap indicator after said predetermined time period.

5. The method of claim 2 wherein said fuel cap indicator remains deactivated when a predetermined number of leak tests consecutively detect said leak.

6. The method of claim 1 further comprising:
deactivating said fuel cap indicator when an occupant of said vehicle indicates that a fuel cap of said vehicle is properly installed.

7. The method of claim 2 wherein said fuel cap indicator remains deactivated when an occupant of said vehicle indicates that a fuel cap of said vehicle is properly installed.

8. The method of claim 6 wherein said occupant activates an actuator on an instrument panel of said vehicle to indicate said fuel cap is properly installed.

9. The method of claim 1 wherein said fuel cap indicator is one of a visible indicator, an audible indicator, and a haptic indicator.

10. A missing fuel cap detection system, comprising:
a leak test module that conducts a plurality of leak tests to detect a leak in an evaporative emissions system of a vehicle;
a refueling detection module that selectively detects a refueling of said vehicle when said leak test module detects said leak; and
a fuel cap detection module that activates a fuel cap indicator in said vehicle when said leak test module detects said leak and said refueling detection module detects said refueling.

11. The missing fuel cap detection system of claim 10 wherein said fuel cap detection module deactivates said fuel cap indicator after a predetermined time period.

12. The missing fuel cap detection system of claim 11 wherein said time period is sufficient to allow an occupant of said vehicle to determine a condition of a fuel cap of said vehicle.

13. The missing fuel cap detection system of claim 11 wherein said fuel cap detection module activates said fuel cap indicator and said leak test module activates an engine malfunction indicator in said vehicle when two of said plurality of leak tests consecutively detect said leak.

14. The missing fuel cap detection system of claim 11 wherein said fuel cap indicator remains deactivated when a predetermined number of said plurality of leaks tests consecutively detect said leak.

15. The missing fuel cap detection system of claim 11 wherein said fuel cap indicator remains deactivated when an occupant of said vehicle indicates that a fuel cap of said vehicle is properly installed.

16. The missing fuel cap detection system of claim 10 wherein said fuel cap detection module deactivates said fuel cap indicator when an occupant of said vehicle indicates that a fuel cap of said vehicle is properly installed.

17. The missing fuel cap detection system of claim 16 wherein said occupant activates an actuator on an instrument panel of said vehicle to indicate said fuel cap is properly installed.

18. The missing fuel cap detection system of claim 10 wherein said fuel cap indicator is one of a visible indicator, an audible indicator, and a haptic indicator.

* * * * *